US011148682B2

(12) United States Patent
Li et al.

(10) Patent No.: US 11,148,682 B2
(45) Date of Patent: Oct. 19, 2021

(54) STEERING ASSISTANCE SYSTEMS AND METHODS

(71) Applicant: Ford Global Technologies, LLC, Dearborn, MI (US)

(72) Inventors: Yuzhou Li, Dearborn, MI (US); Roy Zhou, Dearborn, MI (US); Grant Inskeep, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 239 days.

(21) Appl. No.: 16/468,738

(22) PCT Filed: Dec. 12, 2016

(86) PCT No.: PCT/US2016/066175

§ 371 (c)(1),
(2) Date: Jun. 12, 2019

(87) PCT Pub. No.: WO2018/111219

PCT Pub. Date: Jun. 21, 2018

(65) Prior Publication Data

US 2019/0315375 A1 Oct. 17, 2019

(51) Int. Cl.

| | |
|---|---|
| ***B60W 50/14*** | (2020.01) |
| ***B60W 10/20*** | (2006.01) |
| ***B60W 30/08*** | (2012.01) |
| ***G08G 1/16*** | (2006.01) |
| ***G09B 19/16*** | (2006.01) |

(52) U.S. Cl.

CPC ............ *B60W 50/14* (2013.01); *B60W 10/20* (2013.01); *B60W 30/08* (2013.01); *G08G 1/166* (2013.01); *G09B 19/167* (2013.01); *B60W 2050/146* (2013.01); *B60W 2420/42* (2013.01); *B60W 2554/00* (2020.02); *B60W 2556/50* (2020.02)

(58) Field of Classification Search

CPC ...... G07C 5/008; G07C 5/0808; G06Q 40/08; G06Q 10/10; G06T 17/05; B62D 15/029; B62D 15/025; B60W 50/16; B60W 50/14; B60W 10/20; B60W 2050/007; B60K 2026/022; B60K 2026/023

See application file for complete search history.

(56) References Cited

U.S. PATENT DOCUMENTS

| | | | | |
|---|---|---|---|---|
| 7,681,322 B1 * | 3/2010 | Pruitt | .................. | G01B 11/275 33/203.18 |
| 8,849,515 B2 * | 9/2014 | Moshchuk | ............. | G08G 1/167 701/42 |
| 9,701,340 B1 * | 7/2017 | Lan | ....................... | B60W 50/14 |
| 2007/0244641 A1 * | 10/2007 | Altan | .................... | B60W 50/16 701/300 |

(Continued)

*Primary Examiner* — Jelani A Smith
*Assistant Examiner* — Alexander C. Bost
(74) *Attorney, Agent, or Firm* — Brandon Hicks; Eversheds Sutherland (US) LLP

(57) ABSTRACT

Example steering assistance systems and methods are described. In one implementation, a controller receives inputs from one or more sensors mounted to a vehicle. The controller processes the inputs from the one or more sensors to determine whether a steering change is needed. Responsive to determining that a steering change is needed, the controller provides a steering change recommendation to a driver of the vehicle via a physical rotation of the vehicle steering wheel in a recommended direction.

20 Claims, 8 Drawing Sheets

(56) References Cited

U.S. PATENT DOCUMENTS

| | | | | |
|---|---|---|---|---|
| 2008/0023254 | A1* | 1/2008 | Prost-Fin | B60N 2/0244<br>180/400 |
| 2011/0082623 | A1* | 4/2011 | Lu | B60W 30/09<br>701/41 |
| 2013/0218415 | A1* | 8/2013 | Stahlin | B60W 30/09<br>701/41 |
| 2014/0257628 | A1* | 9/2014 | Lee | B62D 5/0481<br>701/34.4 |
| 2015/0054637 | A1* | 2/2015 | Kim | B60R 16/0232<br>340/438 |
| 2015/0197283 | A1* | 7/2015 | Marti | B62D 15/029<br>701/41 |
| 2015/0307022 | A1* | 10/2015 | Nelson | B60W 50/16<br>701/36 |
| 2016/0023667 | A1* | 1/2016 | Sakurai | B62D 1/04<br>74/552 |
| 2016/0084661 | A1* | 3/2016 | Gautama | G01C 21/365<br>701/400 |
| 2016/0332569 | A1* | 11/2016 | Ishida | B60W 30/08 |
| 2017/0297606 | A1* | 10/2017 | Kim | B62D 1/181 |
| 2017/0369074 | A1* | 12/2017 | Mathes | B60W 30/12 |
| 2019/0016383 | A1* | 1/2019 | Spencer | B60Q 9/008 |
| 2019/0210523 | A1* | 7/2019 | Ploch | B60R 16/027 |

* cited by examiner

STEERING ASSISTANCE SYSTEMS AND METHODS

TECHNICAL FIELD

The present disclosure relates to vehicular systems and, more particularly, to systems and methods that assist a driver of a vehicle in steering the vehicle.

BACKGROUND

Automobiles and other vehicles provide a significant portion of transportation for commercial, government, and private entities. The process of driving a vehicle involves the maintenance of constant situational awareness by a driver of the vehicle. The driver must be aware of objects in the vicinity of the vehicle, as well as any need to steer the vehicle, or to change the speed of the vehicle. Providing the driver of a vehicle with feedback regarding one or more of these aspects of driving the vehicle and helping to improve the situational awareness of the driver can, therefore, reduce the likelihood of accidents and potential injury to vehicle occupants.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
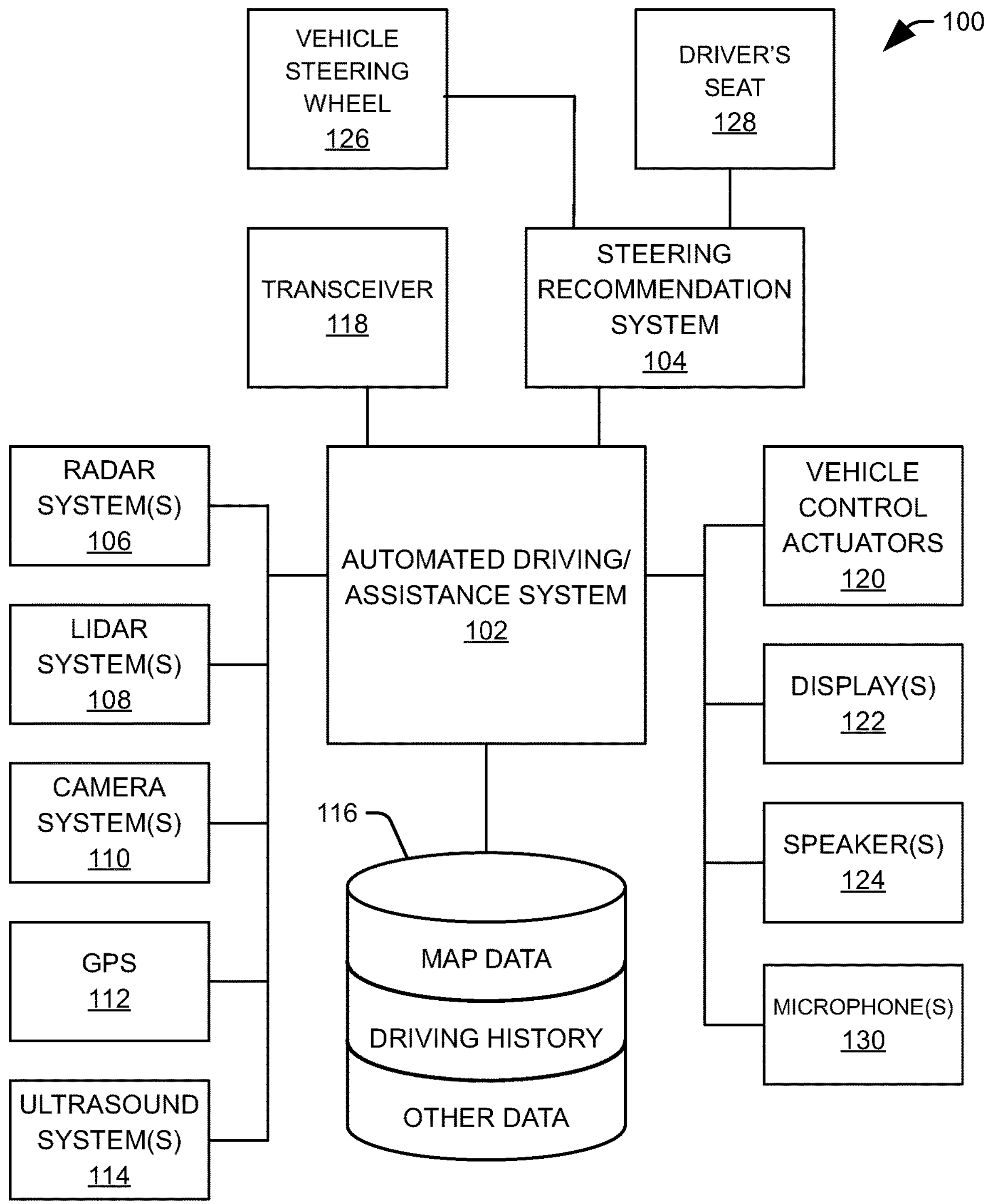
FIG. 1 is a block diagram illustrating an embodiment of a vehicle control system that includes a steering recommendation system.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

FIG. 1 is a block diagram illustrating an embodiment of a vehicle control system 100 that includes steering recommendation system 104. An automated driving/assistance system 102 may be used to automate or control operation of a vehicle or to provide assistance to a human driver. For example, the automated driving/assistance system 102 may control one or more of braking, steering, seat belt tension, acceleration, lights, alerts, driver notifications, radio, vehicle locks, or any other auxiliary systems of the vehicle. In another example, the automated driving/assistance system 102 may not be able to provide any control of the driving (e.g., steering, acceleration, or braking), but may provide notifications and alerts to assist a human driver in driving safely. Vehicle control system 100 includes a steering recommendation system 104 that interacts with various components in the vehicle control system 100 to provide one or more cues, alerts or recommendations to a driver of the vehicle, wherein these cues, alerts or recommendations may include one or more of steering change recommendations, steering cues, acceleration cues, deceleration cues or situational awareness alerts. Steering recommendation system 104 provides these cues, alerts or recommendations to a driver of the vehicle through a vehicle steering wheel 126 or a driver's seat 128. Although steering recommendation system 104 is shown as a separate component in FIG. 1, in alternate embodiments, steering recommendation system 104 may be incorporated into automated driving/assistance system 102 or any other vehicle component.

The vehicle control system 100 also includes one or more sensor systems/devices for detecting a presence of nearby objects or determining a location of a parent vehicle (e.g., a vehicle that includes the vehicle control system 100). For example, the vehicle control system 100 may include radar systems 106, one or more Lidar systems 108, one or more camera systems 110, a global positioning system (GPS) 112, and/or ultrasound systems 114. The one or more camera systems 110 may include a rear-facing camera mounted to the vehicle (e.g., a rear portion of the vehicle), a front-facing camera, and a side-facing camera. Camera systems 110 may also include one or more interior cameras that capture images of passengers and other objects inside the vehicle. The vehicle control system 100 may include a data store 116 for storing relevant or useful data for navigation and safety, such as map data, driving history, or other data. Additionally, data store 116 may store information related to ice or snow previously detected by the current vehicle or reported by other vehicles. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering, seat belt tension, door locks, or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver or passenger notification. Microphones 130 may be included to capture audio signals of the environment around the vehicle to detect, for example, sounds associated with people, animals, emergency vehicles (sirens) and so on around the vehicle.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-118. A path may also be determined based on a route that maneuvers the vehicle around an approaching patch of ice or snow on the roadway. The sensor systems/devices 106-110 and 114 may be used to obtain real-time sensor data so that the automated driving/assistance system 102 can assist a driver or drive a vehicle in real-time.

Figure 2:
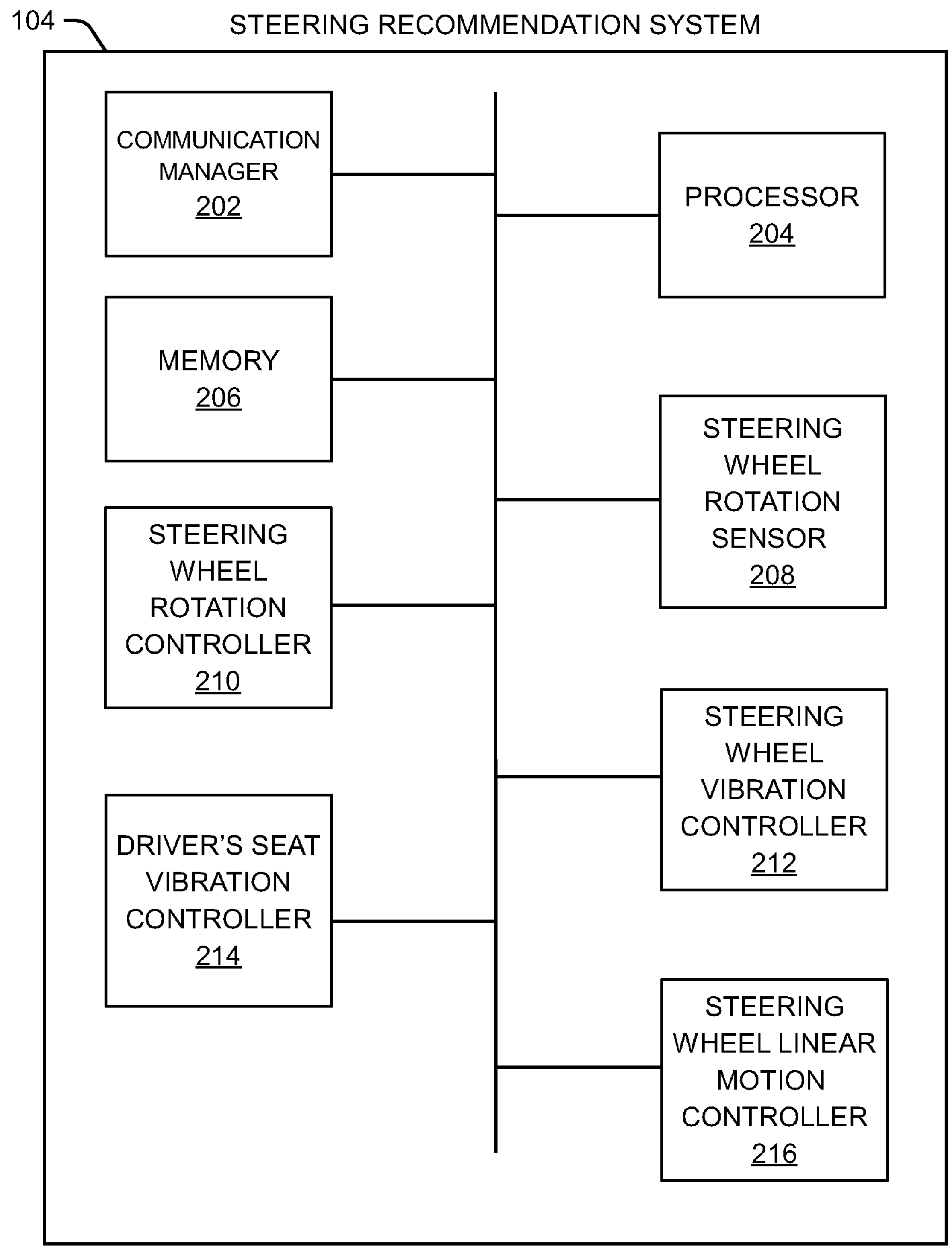
FIG. 2 is a block diagram illustrating an embodiment of detection steering recommendation system.

FIG. 2 is a block diagram illustrating an embodiment of steering recommendation system 104. As shown in FIG. 2, steering recommendation system 104 includes a communication manager 202, a processor 204, and a memory 206. Communication manager 202 allows steering recommendation system 104 to communicate with other systems, such as automated driving/assistance system 102. Processor 204 executes various instructions to implement the functionality provided by steering recommendation system 104 as discussed herein. Memory 206 stores these instructions as well as other data used by processor 204 and other modules and components contained in steering recommendation system 104.

Additionally, steering recommendation system 104 includes a steering wheel rotation sensor 208. Steering wheel rotation sensor 208 senses the amount of rotation of vehicle steering wheel 126. Steering recommendation system 104 also includes a steering wheel rotation controller 210, where steering wheel rotation controller 210 is used to generate a steering recommendation to a driver of the vehicle by physically rotating vehicle steering wheel 126 based on the existing amount of rotation of vehicle steering wheel 126 as sensed by steering wheel rotation sensor 208.

Steering recommendation system 104 also includes a steering wheel vibration controller 212, where steering wheel vibration controller 212 generates one or more steering cues for a driver of the vehicle by generating vibrations in different portions of vehicle steering wheel 126. Steering recommendation system 104 also includes a driver's seat vibration controller 214, where driver's seat vibration controller 214 is configured to generate vibrations in different parts of driver's seat 128 to inform a driver of the vehicle about the presence of one or more objects in the vicinity of the vehicle. A steering wheel linear motion controller 216 is also included in steering recommendation system 104, where steering wheel motion controller 214 is configured to move vehicle steering wheel 126 away from or towards a driver of the vehicle as a way of providing acceleration or deceleration cues respectively to the driver of the vehicle.

Figure 3:
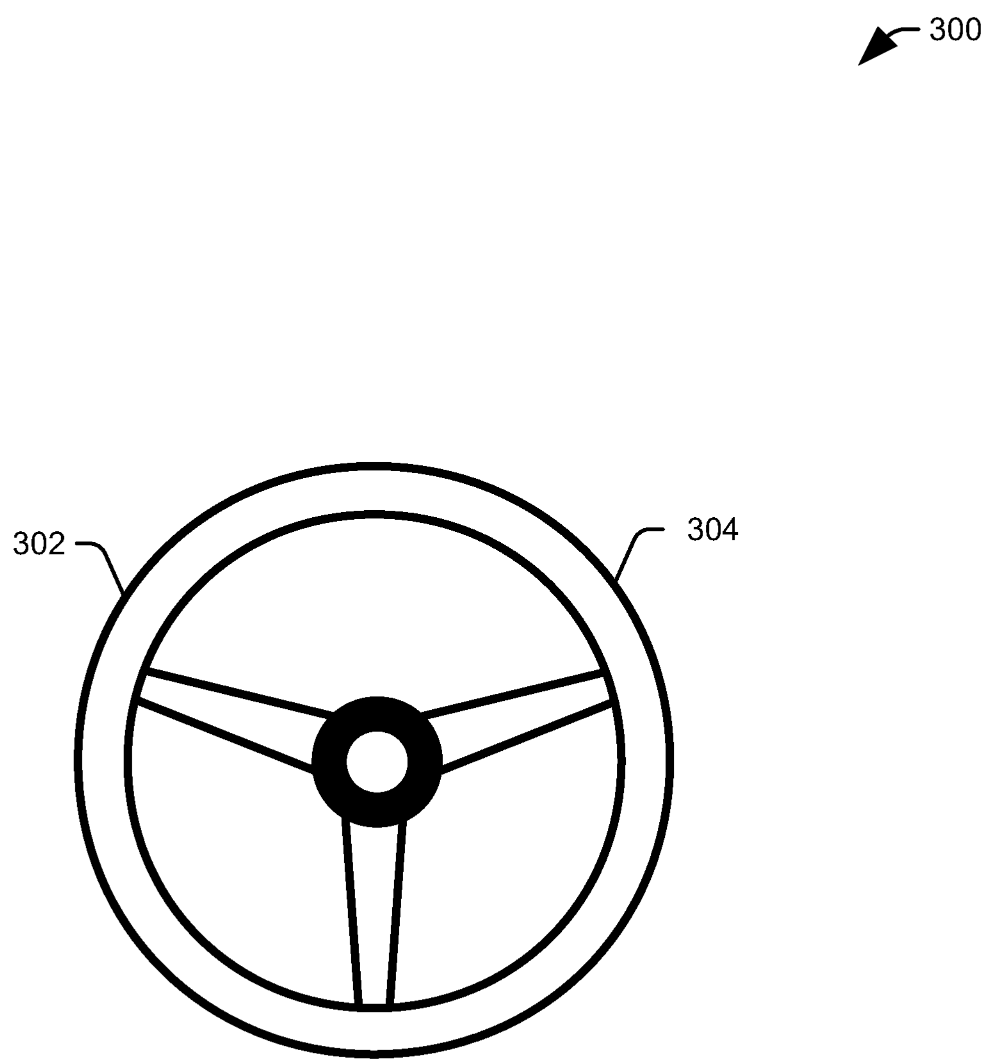
FIG. 3 illustrates an embodiment of a vehicle steering wheel that provides steering cues to a driver of the vehicle.

FIG. 3 illustrates an embodiment of a vehicle steering wheel 300 that provides steering cues to a driver of the vehicle. In some embodiments, vehicle steering wheel 300 is the same as vehicle steering wheel 126. Vehicle steering wheel 300 may be configured such that it receives inputs from steering recommendation system 104, where these inputs are steering cues provided to a driver of the vehicle. In some embodiments, a steering cue to turn left is realized by generating a vibration in a left portion 302 of vehicle steering wheel 300. Similarly, a steering cue to turn right is realized by generating a vibration in a right portion 304 of vehicle steering wheel 300. In some embodiments, one or more haptic pads are mounted to the hands-on area of the steering wheel underneath the steering wheel surface. In alternate embodiments, any other type of system or device can be used to generate vibrations in different parts of the steering wheel.

Figure 4:
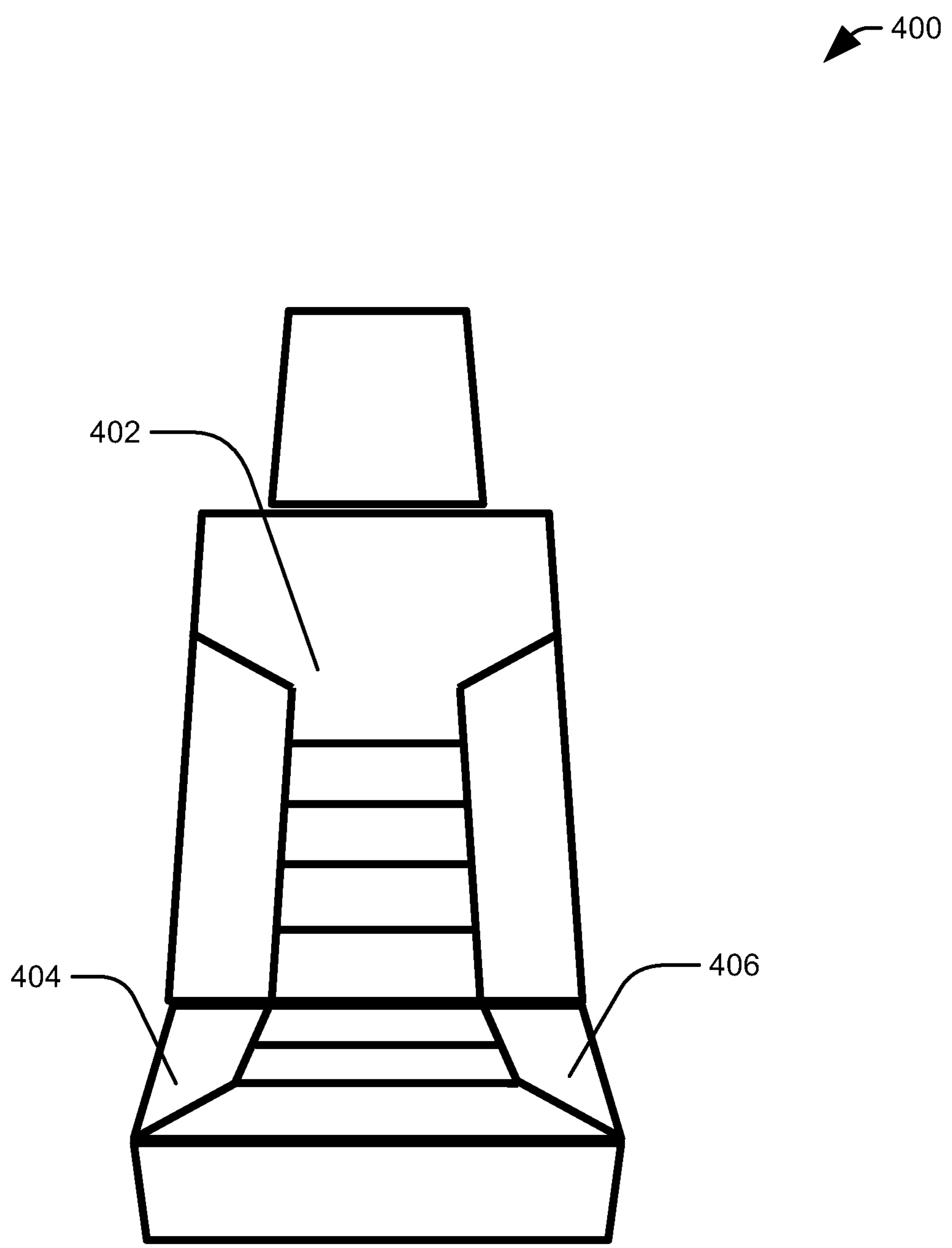
FIG. 4 illustrates an embodiment of a driver's seat, where the driver's seat is configured to provide vibration feedback to a driver of a vehicle.

FIG. 4 illustrates an embodiment of a driver's seat 400, where the driver's seat is configured to provide vibration feedback to a driver of a vehicle. In some embodiments, driver's seat 400 is the same as driver's seat 128. Steering recommendation system 104 may generate vibrations in one or more portions of driver's seat 400 based on inputs from one or more sensors such as radar system(s) 106, lidar system(s) 108 and camera systems(s) 110, where the inputs from these sensors are used to determine the presence of one or more objects in the vicinity of the vehicle. In this regard, the combination of processing sensor inputs by steering recommendation system 104 and the corresponding generation of vibrations by steering recommendation system 104 in one or more portions of driver's seat 400 constitutes a situational awareness alert system for a driver of the vehicle that serves to alert a driver of the vehicle about objects present in the vicinity of the vehicle. In some embodiments, steering recommendation system 104 generates vibrations in a back portion 402 of driver's seat 400 to alert a driver of the vehicle about an object present at the back of the vehicle. In other embodiments, steering recommendation system 104 generates vibrations in a right portion 404 of driver's seat 400 to alert a driver of the vehicle about an object present at the right of the vehicle. In still other embodiments, steering recommendation system 104 generates vibrations in a left portion 406 of driver's seat 400 to alert a driver of the vehicle about an object present at the left of the vehicle. In still other embodiments, steering recommendation system 104 generates vibrations in back portion 402, right portion 404 and left portion 406 of driver's seat 400 to alert a driver of the vehicle about an object present in front of the vehicle. Based on these alerts, a driver of the vehicle can take defensive driving measures and/or evasive actions to minimize the risk of any accident or collision.

Figure 5:
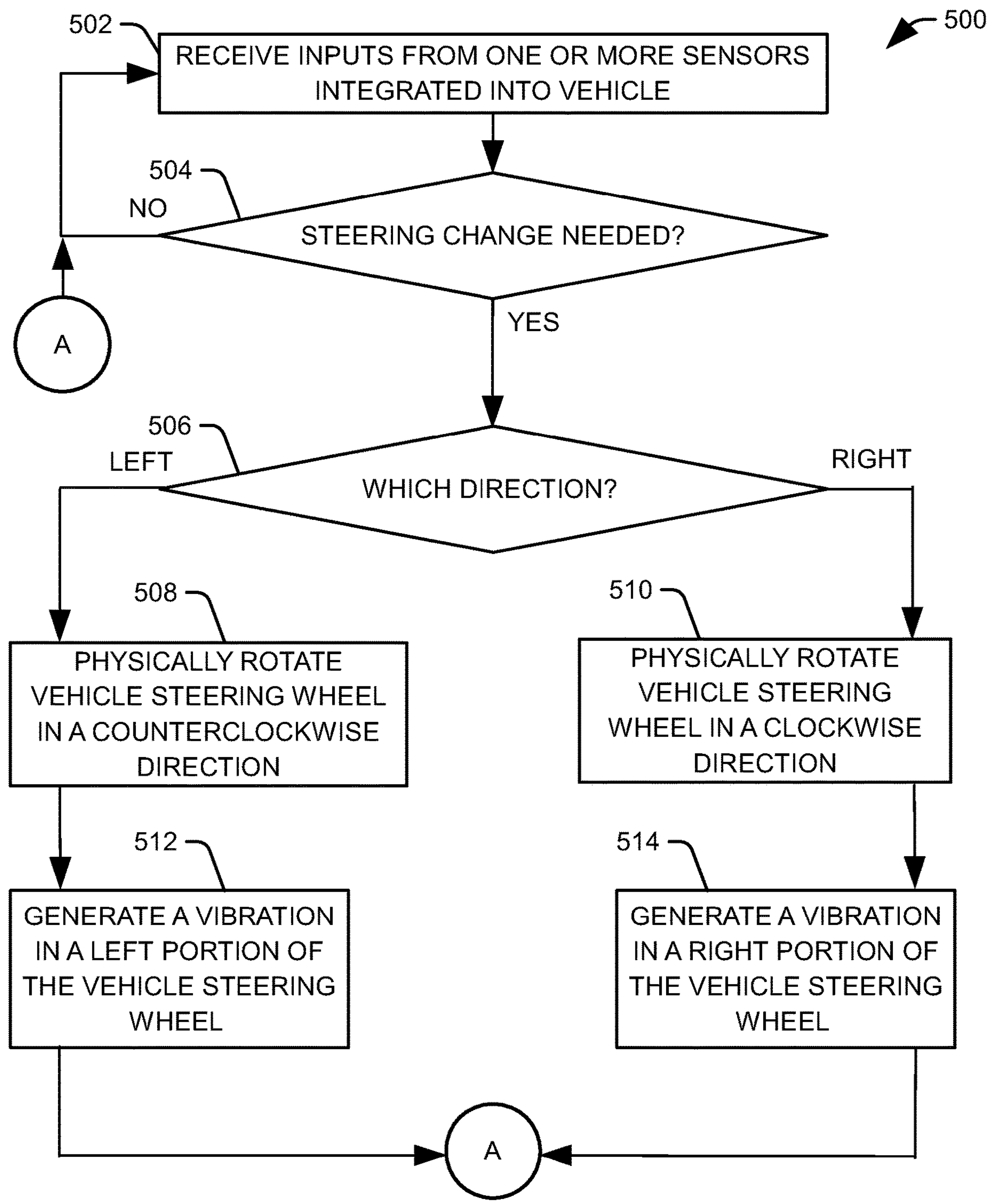
FIG. 5 illustrates an embodiment of a method for providing steering cues to a driver of a vehicle.

FIG. 5 illustrates an embodiment of a method 500 for providing steering cues to a driver of a vehicle. At 502, steering recommendation system 104 receives inputs from one or more sensors integrated into (or mounted to) the vehicle, where the sensors may include one or more of radar system(s) 106, lidar system(s) 108, camera systems(s) 110 and so on. At 504, steering recommendation system 104 processes the inputs from the one or more sensors to determine whether a steering change is needed. If no steering change is needed, the method returns back to 502. On the other hand, for example, steering recommendation system might detect the presence of an obstacle such as road debris in the path of the vehicle and determine that it would be best to steer around that obstacle. In this case, the method proceeds to 506, where additional processing by steering recommendation system 104 determines whether to steer right or steer left. If steering recommendation system 104 determines that steering right is recommended, the method proceeds to 510, where steering recommendation system 104 generates a steering recommendation to steer right to a driver of the vehicle by physically rotating vehicle steering wheel 126 in a clockwise direction. In some embodiments, the system partially turns (e.g., nudges) the steering wheel in the clockwise direction, but does turn the steering wheel the full amount needed. Thus, the driver must also provide rotational force to the steering wheel to fully execute the necessary steering. Also, at 514, steering recommendation system 104 generates one or more vibrations in right portion 304 of steering wheel 126 (or 300) as an added haptic steering cue for a driver of the vehicle. The method then proceeds to A, where it returns back to 502.

Returning back to 506, if steering recommendation system 104 determines that steering left is recommended, the method proceeds to 508, where steering recommendation system 104 generates a steering recommendation to steer left to a driver of the vehicle by physically rotating (e.g., nudging) vehicle steering wheel 126 in a counterclockwise direction. Also, at 512, steering recommendation system 104 generates one or more vibrations in left portion 302 of vehicle steering wheel 126 (or 300) as an added haptic steering cue for a driver of the vehicle. The method then proceeds to A, where it returns back to 502.

In some embodiments, when steering recommendation system 104 determines that a steering recommendation does not need to be generated, steering wheel 126 may be configured via, for example, vehicle control actuators 120, such that a greater physical effort is required by a driver of the vehicle to turn the vehicle steering wheel 126. This adds a measure of safety to the system, ensuring that the probability of unintended steering changes on behalf of a driver of the vehicle is minimized. On the other hand, if a steering change is recommended by steering recommendation system 104, the effort required by a driver of the vehicle to turn the vehicle steering wheel 126 may be reduced, thus facilitating an easy change in the direction of vehicle motion by the driver, further augmented by the physical rotation (e.g., nudging) of vehicle steering wheel 126 as provided by steering recommendation system 104. This variable steering effort scheme can also be associated with manual direction changes such as lane changes. For example, when automated driving/assistance system 102 and/or steering recommendation system 104 detect that a turn indicator is switched on to change lanes or to make a turn, the steering effort required by a driver of the vehicle can be temporarily reduced until the lane change or turn is negotiated, after which the relative stiffness associated with turning vehicle steering wheel 126 can be increased automatically by automated driving/assistance system 102 and/or steering recommendation system 104. Furthermore, the variable steering effort required can also be adjusted according to the need to follow a curve in the road, where the effort required by a driver of a vehicle to turn vehicle steering wheel 126 may take on a lower value within a certain rotation interval. Also, steering recommendation system 104 can iteratively continue providing steering cues to a driver of the vehicle by providing ongoing rotations to vehicle steering wheel 126 if method 500 determines that a driver of the vehicle is not using sufficient steering effort. This aspect is seen in the feedback-looped flow diagram, where the method returns from A to 502 and evaluates the steering effort of a driver of the vehicle on a continuous basis. After a steering change is completed, steering recommendation system 104 may physically rotate vehicle steering wheel 126 back to its original position corresponding to vehicle motion along a straight line.

In some embodiments, the vibrations generated in vehicle steering wheel 126 may also be qualitatively varied to account for different kinds of steering scenarios. For example, a steering cue associated with a lane change may be implemented as two light vibrations in the corresponding portion (left or right, depending on the desired direction) of vehicle steering wheel 126. Or, if a turn is needed (as determined by, for example, GPS 112), steering recommendation system 104 may generate a steering cue comprising two hard vibrations in the corresponding portion (left or right, depending on the desired direction) of vehicle steering wheel 126. When the vehicle is traveling along a curve, for example, steering recommendation system 104 may generate a single vibration in the corresponding portion (left or right, depending on the desired direction) of vehicle steering wheel 126.

Figure 6:
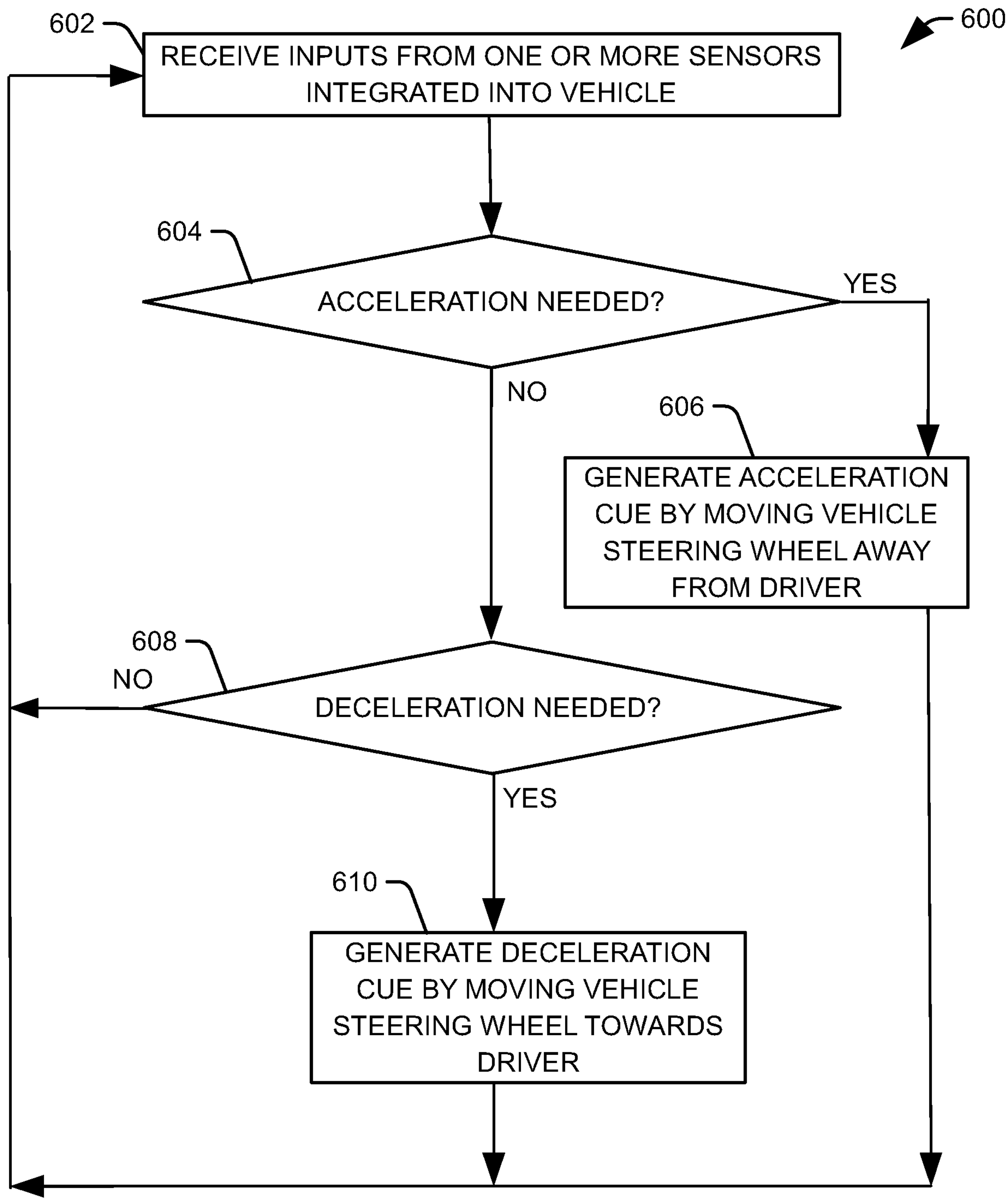
FIG. 6 illustrates an embodiment of a method for providing acceleration or deceleration cues to a driver of a vehicle.

FIG. 6 illustrates an embodiment of a method 600 for providing acceleration or deceleration cues to a driver of a vehicle. At 602, steering recommendation system 104 receives inputs from one or more sensors integrated into (or mounted to) the vehicle, where the sensors may include one or more of radar system(s) 106, lidar system(s) 108, camera systems(s) 110 and so on. At 604, steering recommendation system 104 processes the inputs from the one or more sensors to determine whether vehicle acceleration is needed. If vehicle acceleration is needed, the method proceeds to 606, where steering recommendation system 104 generates an acceleration cue for a driver of the vehicle by moving vehicle steering wheel 126 from a default position in a direction away from a driver of the vehicle, after which the method returns back to 602, where it continues to receive inputs from the one or more sensors. In some embodiments the vehicle steering wheel 126 is moved away from the driver by retracting the steering column to which the steering wheel is mounted. The acceleration cue is essentially a signal for a driver of the vehicle to apply an acceleration input to the vehicle by, for example, depressing the accelerator pedal or providing an acceleration input via a cruise control paddle.

Returning back to 604, if steering recommendation system 104 determines that vehicle acceleration is not needed, then the method proceeds to 608, where steering recommendation system 104 determines whether vehicle deceleration is needed. If vehicle deceleration is not needed, the method returns back to 602. However, if vehicle deceleration is needed, the method proceeds to 610, where steering recommendation system 104 generates an deceleration cue for a driver of the vehicle by moving vehicle steering wheel 126 from a default position in a direction towards a driver of the vehicle, after which the method returns back to 602, where it continues to receive inputs from the one or more sensors. In some embodiments the vehicle steering wheel 126 is moved towards the driver by extending the steering column to which the steering wheel is mounted. The deceleration cue is essentially a signal for a driver of the vehicle to apply a deceleration input to the vehicle by, for example, depressing the brake pedal or providing a deceleration input via a cruise control paddle. When steering recommendation system 104 determines that sufficient acceleration or deceleration input (as necessary) has been applied, steering recommendation system 104 moves vehicle steering wheel 126 back to its default position. In some embodiments, a driver of a vehicle may be alerted via a click or other indication to denote that vehicle steering wheel 126 has returned back to its default position.

Figure 7A:
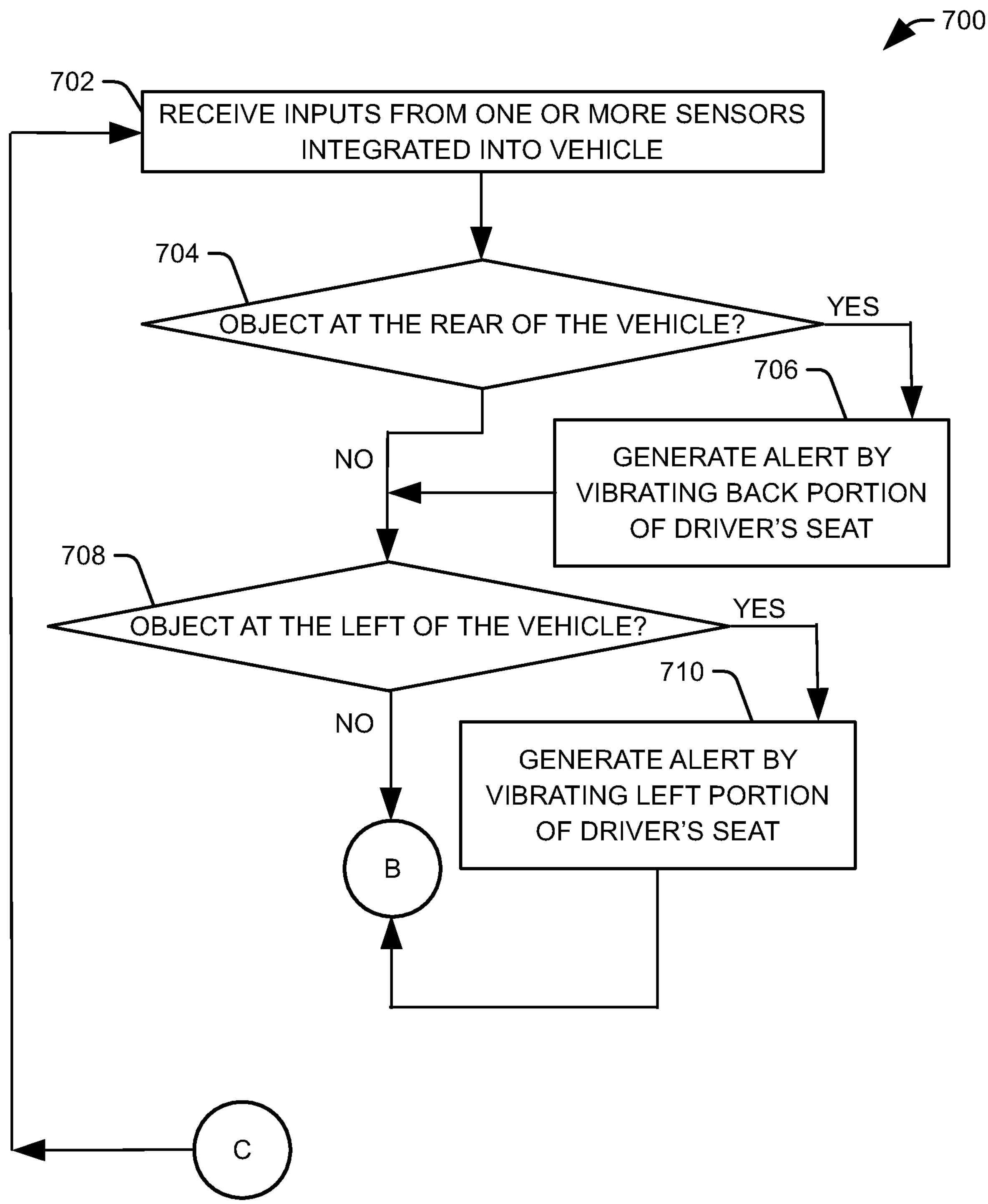
FIGS. 7A and 7B illustrate an embodiment of a method for helping improve the situational awareness of a driver of a vehicle.

FIG. 7A illustrates an embodiment of a method 700 for helping improve the situational awareness of a driver of a vehicle. At 702, steering recommendation system 104 receives inputs from one or more sensors integrated into (or mounted to) the vehicle, where the sensors may include one or more of radar system(s) 106, lidar system(s) 108, camera systems(s) 110 and so on. Detection methods to detect objects around the vehicle could also include audio detection methods by using microphone(s) 130 that detect, for example, a honk from the horn of another vehicle or the siren of an emergency vehicle. At 704, steering recommendation system 104 processes the inputs from the one or more sensors to determine whether there is an object at the rear of the vehicle, where an object could include one or more of vehicles, animals, people, and so on. If an object is detected at the back of the vehicle, steering recommendation system 104 generates a corresponding alert for a driver of the vehicle at 706, by vibrating back portion 402 of driver's seat 400, after which the method proceeds to 708. On the other hand, if no object at the rear of the vehicle is detected at 704, the method proceeds directly to 708, where steering recommendation system 104 processes the inputs from the one or more sensors to determine whether there is an object at the left of the vehicle. If an object is detected at the left of the vehicle, steering recommendation system 104 generates a corresponding alert for a driver of the vehicle at 710, by vibrating left portion 406 of driver's seat 400, after which the method proceeds to B. On the other hand, if no object at the left of the vehicle is detected at 708, the method proceeds directly to B.

Figure 7B:
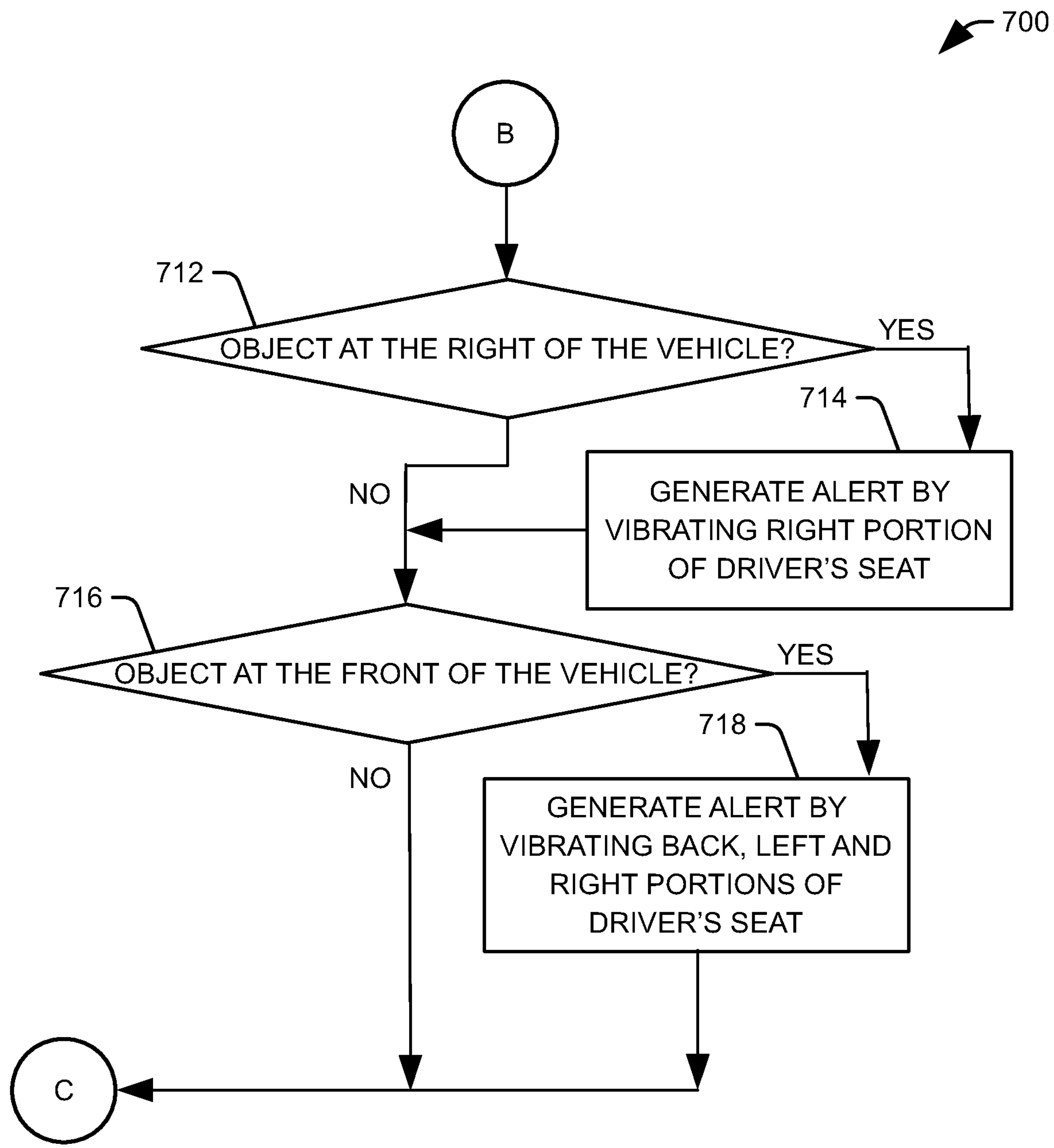

FIG. 7B describes method 700, continuing from FIG. 7A. Starting at B, the method proceeds to 712, where steering recommendation system 104 processes the inputs from the one or more sensors to determine whether there is an object at the right of the vehicle. If an object is detected at the right of the vehicle, steering recommendation system 104 generates a corresponding alert for a driver of the vehicle at 714, by vibrating right portion 404 of driver's seat 400, after which the method proceeds to 716. On the other hand, if no object at the right of the vehicle is detected at 708, the method proceeds directly to 716, where steering recommendation system 104 processes the inputs from the one or more sensors to determine whether there is an object at the front of the vehicle. If an object is detected at the front of the vehicle, steering recommendation system 104 generates a corresponding alert for a driver of the vehicle at 718, by vibrating back portion, 402, left portion 406 and right portion 404 of driver's seat 400, after which the method proceeds to C. On the other hand, if no object at the front of the vehicle is detected at 716, the method proceeds directly to C, and returns back to 702.

The systems and methods described above not only help vehicle drivers without disabilities, but also assist vehicle drivers who may be visually impaired. This system aims to enable those individuals with, for example, visual impairments who are unable to drive, to avail of the driver assistance features of these systems and methods to drive and control a motor vehicle.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:

receiving, at a controller, inputs from one or more sensors mounted to a vehicle;

processing, by the controller, the inputs from the one or more sensors to determine whether a steering change is needed;

providing, responsive to determining that a steering change is needed, a steering change recommendation to a driver of the vehicle via a physical rotation of the vehicle steering wheel in a recommended direction; and generating, by the controller, an acceleration cue, wherein the acceleration cue is generated in response to a need for vehicle acceleration, wherein the acceleration cue recommends greater acceleration from the driver of the vehicle, and wherein the generation of the acceleration cue comprises moving the vehicle steering wheel from a default position, in a direction away from the driver of the vehicle.

2. The method of claim 1, wherein the physical rotation of the steering wheel is in a counterclockwise direction if the steering change includes a turn to the left.

3. The method of claim 1, wherein the physical rotation of the steering wheel is in a clockwise direction if the steering change includes a turn to the right.

4. The method of claim 1, further comprising providing a steering cue to turn left by generating a vibration in a left portion of the steering wheel.

5. The method of claim 1, further comprising providing a steering cue to turn right by generating a vibration in a right portion of the steering wheel.

6. The method of claim 1, wherein a greater steering wheel movement is allowed by the controller in response to a steering change recommendation, as compared to the steering wheel movement allowed in the absence of any steering change recommendations, and wherein the greater steering wheel movement is allowed to facilitate the implementation of the recommended steering change.

7. The method of claim 1, further comprising a deceleration cue generated by the controller, wherein the deceleration cue is generated in response to a need for vehicle braking, wherein the deceleration cue recommends braking from a-the driver of the vehicle, and wherein the generation of the deceleration cue comprises moving the vehicle steering wheel from a-the default position, in a direction towards the driver of the vehicle.

8. The method of claim 1, further comprising, implementing, by the controller, a situational awareness alert system based on inputs from the one or more sensors, wherein the situational awareness system alerts the driver of the vehicle about objects in the vicinity of the vehicle via vibrations generated in different portions of a driver's seat.

9. The method of claim 8, wherein an alert associated with an object at the rear of the vehicle is associated with a vibration generated in a back portion of the driver's seat.

10. The method of claim 8, wherein an alert associated with an object at the left of the vehicle is associated with a vibration generated in a bottom left portion of the driver's seat.

11. The method of claim 8, wherein an alert associated with an object at the right of the vehicle is associated with a vibration generated in a bottom right portion of the driver's seat.

12. The method of claim 8, wherein an alert associated with an object at the front of the vehicle is associated with a vibration generated in a back portion of the driver's seat, a vibration generated in a bottom left portion of the driver's seat, and a vibration generated in a bottom right portion of the driver's seat.

13. The method of claim 8, wherein the situational awareness alert system is used to generate steering change recommendations to help guide the driver of the vehicle away from a potentially dangerous situation.

14. An apparatus comprising:

a plurality of sensors mounted to a vehicle; and a processing system configured to receive one or more inputs from the plurality of sensors, wherein the processing system is further configured to process the one or more inputs to determine whether a steering change is needed and accordingly provide a steering change recommendation to a driver of the vehicle via a physical rotation of the vehicle steering wheel in a recommended direction, wherein the processing system is further configured to generate (i) an acceleration cue, wherein the acceleration cue is generated in response to a need for vehicle acceleration, wherein the acceleration cue recommends greater acceleration from the driver of the vehicle, and wherein the generation of the acceleration cue comprises moving the vehicle steering wheel from a default position, in a direction away from the driver of the vehicle, and/or (ii) a deceleration cue, wherein the deceleration cue is generated in response to a need for vehicle braking, wherein the deceleration cue recommends braking from the driver of the vehicle, and wherein the generation of the deceleration cue comprises moving the vehicle steering wheel from the default position, in a direction towards the driver of the vehicle.

15. The apparatus of claim 14, wherein the physical rotation of the steering wheel is in a counterclockwise direction if the steering change includes a turn to the left.

16. The apparatus of claim 14, wherein the physical rotation of the steering wheel is in a clockwise direction if the steering change includes a turn to the right.

17. The apparatus of claim 14, wherein the processing system is further configured to generate a steering cue to turn left by generating a vibration in a left portion of the steering wheel.

18. The apparatus of claim 14, wherein the processing system is further configured to generate a steering cue to turn right by generating a vibration in a right portion of the steering wheel.

19. The apparatus of claim 14, wherein a greater steering wheel movement is allowed in response to a steering change recommendation as compared to the steering wheel movement allowed in the absence of any steering change recommendations, and wherein the greater steering wheel movement is allowed to facilitate the implementation of the recommended steering change.

20. A method comprising:

receiving, at a controller, inputs from one or more sensors mounted to a vehicle;

processing, by the controller, the inputs from the one or more sensors to determine whether a steering change is needed;

providing, responsive to determining that a steering change is needed, a steering change recommendation to a driver of the vehicle via a physical rotation of the vehicle steering wheel in a recommended direction; and generating, by the controller, a deceleration cue, wherein the deceleration cue is generated in response to a need for vehicle braking, wherein the deceleration cue recommends braking from the driver of the vehicle, and wherein the generation of the deceleration cue comprises moving the vehicle steering wheel from a default position, in a direction towards the driver of the vehicle.

* * * * *